(12) United States Patent
Bonhomme (10) Patent No.: US 6,954,618 B2
(45) Date of Patent: Oct. 11, 2005

(54) METHOD AND DEVICE FOR DETERMINING THE FADING COEFFICIENTS OF PATHS OF A MULTI-PATH TRANSMISSION CHANNEL LINKING, IN PARTICULAR, A BASE STATION AND A CELLULAR MOBILE TELEPHONE

(75) Inventor: Corinne Bonhomme, Sergy (FR)

(73) Assignee: STMicroelectronics N.V., Amsterdam (NL)

(*) Notice: Subject to any disclaimer, the term of this patent is extended or adjusted under 35 U.S.C. 154(b) by 549 days.

(21) Appl. No.: 10/253,769

(22) Filed: Sep. 24, 2002

(65) Prior Publication Data

US 2003/0060167 A1 Mar. 27, 2003

(30) Foreign Application Priority Data

Sep. 25, 2001 (EP) .......................... 01122582

(51) Int. Cl.⁷ .............................................. H04B 15/00
(52) U.S. Cl. .................... 455/65; 455/505; 455/504; 455/63.1; 375/346; 375/347
(58) Field of Search .......................... 455/65, 505, 504, 455/63.1; 375/346, 347

(56) References Cited

U.S. PATENT DOCUMENTS 5,204,878 A * 4/1993 Larsson ...................... 375/232
5,794,128 A * 8/1998 Brockel et al. ............ 455/67.11
2002/0042279 A1 * 4/2002 Da Rocha et al. ............ 455/456

OTHER PUBLICATIONS

Baltersee et al., Performance Analysis of Phasor Estimation Algorithms for a FDD–UMTS Rake Receiver, 2000 IEEE Sixth International Symposium on Spread Spectrum Techniques and Applications, pp. 476–480, vol. 2, XP002192516.

Chaufray et al., Consistent Estimation of Rayleigh Fading Channel Second Order Statistics in the Context of the Wideband CDMA Mode of the UMTS, 2001 IEEE International Conference on Acoustics, Speech, and Signal Processing, pp. 2189–2192, vol 4, XP002192517.

* cited by examiner

*Primary Examiner*—Vivian Chin
*Assistant Examiner*—Minh D. Dao
(74) *Attorney, Agent, or Firm*—Lisa K. Jorgenson; Allen, Dyer, Doppelt, Milbrath & Gilchrist, P.A.

(57) ABSTRACT

First estimations of the fading coefficients of a multi-path transmission channel are carried out in the sense of maximum likelihood. Sets of Wiener filter coefficients are stored according to predetermined speeds of movement of the mobile terminal and predetermined power levels of the signal. The real speed of the mobile terminal is estimated and the power of the signal for each path is measured. From this, a set of Wiener filter coefficients is derived with which the first estimations are filtered to obtain the final estimation of the fading coefficients.

21 Claims, 4 Drawing Sheets

METHOD AND DEVICE FOR DETERMINING THE FADING COEFFICIENTS OF PATHS OF A MULTI-PATH TRANSMISSION CHANNEL LINKING, IN PARTICULAR, A BASE STATION AND A CELLULAR MOBILE TELEPHONE

FIELD OF THE INVENTION

The present invention relates to communication systems, and more particularly, to a wireless communication system operating according to the Universal Mobile Telecommunications System (UMTS) standard.

BACKGROUND OF THE INVENTION

In a wireless communication system, a base station communicates with a plurality of remote terminals, such as cellular mobile telephones. Frequency Division Multiple Access (FDMA) and Time Division Multiple Access (TDMA) are the conventional multiple access schemes for delivering services simultaneously to a certain number of terminals. The basic idea underlying FDMA and TDMA systems is to respectively share the available resource in several frequencies or several time slots in such a way that several terminals can operate simultaneously without causing interference.

Telephones operating according to the GSM standard belong to FDMA and TDMA systems in the sense that transmission and reception are carried out at different frequencies and also using different time slots. In contrast to these systems using a division of frequency or a division of time, Code Division Multiple Access (CDMA) systems allow several users to share a common frequency and a common time channel using a coded modulation. Among the CDMA systems, there is the CDMA 2000 system, the WCDMA (Wideband CDMA) system or the IS-95 standard.

In CDMA systems, as is well known to those skilled in the art, a scrambling code is associated with each base station and enables one base station to be differentiated from another. Furthermore, an orthogonal code, known as an OVSF code, is allocated to each remote terminal, for example, a cellular mobile telephone. All of the OVSF codes are orthogonal with respect to each other, and this enables one remote terminal to be differentiated from another. Before transmitting a signal over the transmission channel intended for a remote terminal, the signal has been scrambled and spread by the base station using the scrambling code of the base station and the OVSF code of the remote terminal.

In CDMA systems, a further distinction can be made between those systems which use a separate frequency for transmission and reception (CDMA-FDD system), and those which use a common frequency for transmission and reception but separate time domains for transmission and reception (CDMA-TDD system).

In UMTS systems, a receiver normally referred to as a Rake receiver is used. This receiver is used to carry out time alignment, descrambling, and despreading for combining delayed versions of the signal initially transmitted by the base station. These versions result from the multi-path transmission characteristics of the transmission medium. In particular, each path introduces a different delay.

The Rake receiver conventionally has a certain number of fingers respectively corresponding to the different paths of the transmission medium. The Rake receiver receives at its input the values of the different delays of each path, and also the value of the fading coefficients of the transmission channel paths. The fading coefficients of the paths of the multi-path transmission channel are to be determined. Since these coefficients are complex coefficients, the amplitude and the phase of the fading of each path are determined. This determination forms part of the channel estimation.

In the context of channel estimation, which is necessary for any coherent reception, as is the case for the UMTS standard, each time slot includes a transmission frame and for each finger of the Rake receiver, that is for each path, the phase and amplitude of the fading are estimated.

Among the known approaches for estimating these parameters, there is the method which includes a straightforward correlation of the received signal with the product of the spreading and scrambling code. However, such a method is very sub-optimal since it does not use the observations arising from the signal.

Among the optimal methods, there is the Wiener method which is well known to the person skilled in the art. The Wiener method involves filtering the estimations in the sense of maximum likelihood by a Wiener filter. This filter is constructed from the inversion of the correlation matrix of the signal. Moreover, this method assumes knowledge of the bits transmitted. This method, although optimal in terms of performance, remains extremely complex to implement.

SUMMARY OF THE INVENTION

In view of the foregoing background, an object of the present invention is to provide a method for determining the fading coefficients of a multi-path transmission channel, which is both stable and less complex to implement than the Wiener method.

The invention is applied advantageously to CDMA type communication systems, and more particularly, to CDMA-FDD type systems. The invention is also applied to FDMA and TDMA type communication systems, and in particular, to GSM and GPRS telephones. More generally, these telephones use a coherent reception, and in particular, operate according to the UMTS standard which must be capable, for example, of operating simultaneously under a CDMA system, such as the WCDMA system, and under an FDMA and TDMA system.

This and other objects, advantages and features according to the present invention are provided by adapting the Wiener method by reducing the search from an infinite set of filters to a finite set. The invention therefore provides a method for determining the fading coefficients of a path of a multi-path transmission channel linking a base station and a mobile terminal, for example, a cellular mobile telephone.

According to a general characteristic of the invention, the process comprises a determination of first estimation values of the fading coefficients in the sense of maximum likelihood. Moreover, several sets of coefficients of a Wiener filter are stored. The sets of coefficients are respectively precalculated for several sets of different predetermined values of speed of movement of the mobile terminal and of power of the signal, using an autocorrelation function, assumed to be known, for the fading coefficients.

Moreover, the speed of movement of the mobile terminal and the power of the signal of each path are estimated. A selection is then carried out, for each path, of a set of precalculated Wiener filter coefficients from the result of the comparison between the estimated speed of movement and power of the signal, and the sets of predetermined values of speed of movement and of signal power. The fading coefficients are then determined by filtering the first corresponding estimation values. This filtering uses the selected sets of precalculated Wiener coefficients.

Thus, according to the invention, due to the use of an autocorrelation function that is assumed to be known for the fading coefficients, for example, a function using a Jake model which is an autocorrelation model generally adopted for propagation in a built-up environment and which involves use notably of a Bessel function of the first kind of order zero, the filter thus obtained is observed to depend only on the speed of movement of the mobile terminal and on the power of the received signal. The filters will therefore be precalculated and tabulated according to these two parameters i.e., power and speed.

Thus, carrying out a precalculation once for all the filters considerably reduces the complexity of implementation since the coefficients of the filters are stored in a memory. Moreover, the filters thus calculated originate from a stable system, therefore have good characteristics, and are moreover very close to an optimal version.

Furthermore, the invention avoids the need to perform a matrix inversion in real time which is always a very delicate operation. Moreover, the properties of this matrix give rise to the fact that if it is estimated at each slot, due to the presence of noise, the system may become unstable.

The closest filter may be chosen according to two criteria: power of the signal, i.e., signal/noise ratio, and speed. Then the estimations obtained in the sense of maximum likelihood are filtered. The complexity of the invention is therefore reduced to a search of the coefficients of the most appropriate filter and to the associated filtering.

According to a method of implementation of the invention, the determination of the first estimation values of the fading coefficients in the sense of maximum likelihood can be obtained by multiplying the signals from the different paths by the complex conjugate of a known symbol, for example, the symbols transported by a common channel known to the person skilled in the art as CPICH for a WCDMA-FDD transmission, that is in the downlink direction from the base station to the telephone. The use of this type of channel is particularly advantageous since such a channel is not modulated and all the symbols are the same.

As is the case for WCDMA systems, when the information conveyed on the transmission channel is made up of chips and is conveyed on a series of successive frames each subdivided into a predetermined number of slots, the determination of the first estimation values of the fading coefficients includes an estimation of these first values on a predetermined number of chips of each slot. This is because it is not necessary to determine these first estimation values on each chip since at chip level the variation in the fading is very small. In these conditions, it is preferable to estimate these first estimation values of the fading coefficients on a certain number of chips (256, 512 or 2560). Thus, for each slot, a certain number of first estimation values will be obtained, for example, 5.

Another aspect of the invention is directed to a device for estimating the fading coefficients of paths of a multi-path transmission channel linking a base station and a mobile terminal. According to a general characteristic of the invention, this device comprises first means of calculation for determining the first estimation values of the fading coefficients in the sense of maximum likelihood, and a memory containing several sets of coefficients of a Wiener filter respectively precalculated for several sets of different predetermined values of speeds of movement of the mobile terminal and of signal power, using an autocorrelation function that is assumed to be known for the fading coefficients.

The device further comprises first estimation means for estimating the speed of movement of the mobile terminal, second estimation means for estimating the power of the signal of each path, and selection means for selecting for each path a set of precalculated Wiener filter coefficients from the result of the comparison between the estimated speed of movement and the signal power and the sets of predetermined values of speed of movement and of signal power. Second calculation means are provided for determining the fading coefficients by a filtering of the first corresponding estimation values. This filtering uses the selected sets of precalculated Wiener coefficients.

To carry out a determination in the sense of maximum likelihood, the first calculation means comprise multiplication means for multiplying the signals from the various paths by the complex conjugate of a known symbol. When the information conveyed on the transmission channel is made up of chips and is conveyed within successive frames each subdivided into a predetermined number of slots, the first calculation means advantageously comprise third estimation means for estimating these first values on a predetermined number of chips of each slot.

A subject of the invention is also a mobile terminal, for example, a cellular mobile telephone, incorporating a device for determining the fading coefficients of the type defined above.

BRIEF DESCRIPTION OF THE DRAWINGS

Other advantages and characteristics of the invention will become apparent on examining the detailed description of methods of implementation and embodiments, which are not at all limiting, and the appended drawings, in which.

DETAILED DESCRIPTION OF THE PREFERRED EMBODIMENTS

Figure 1:
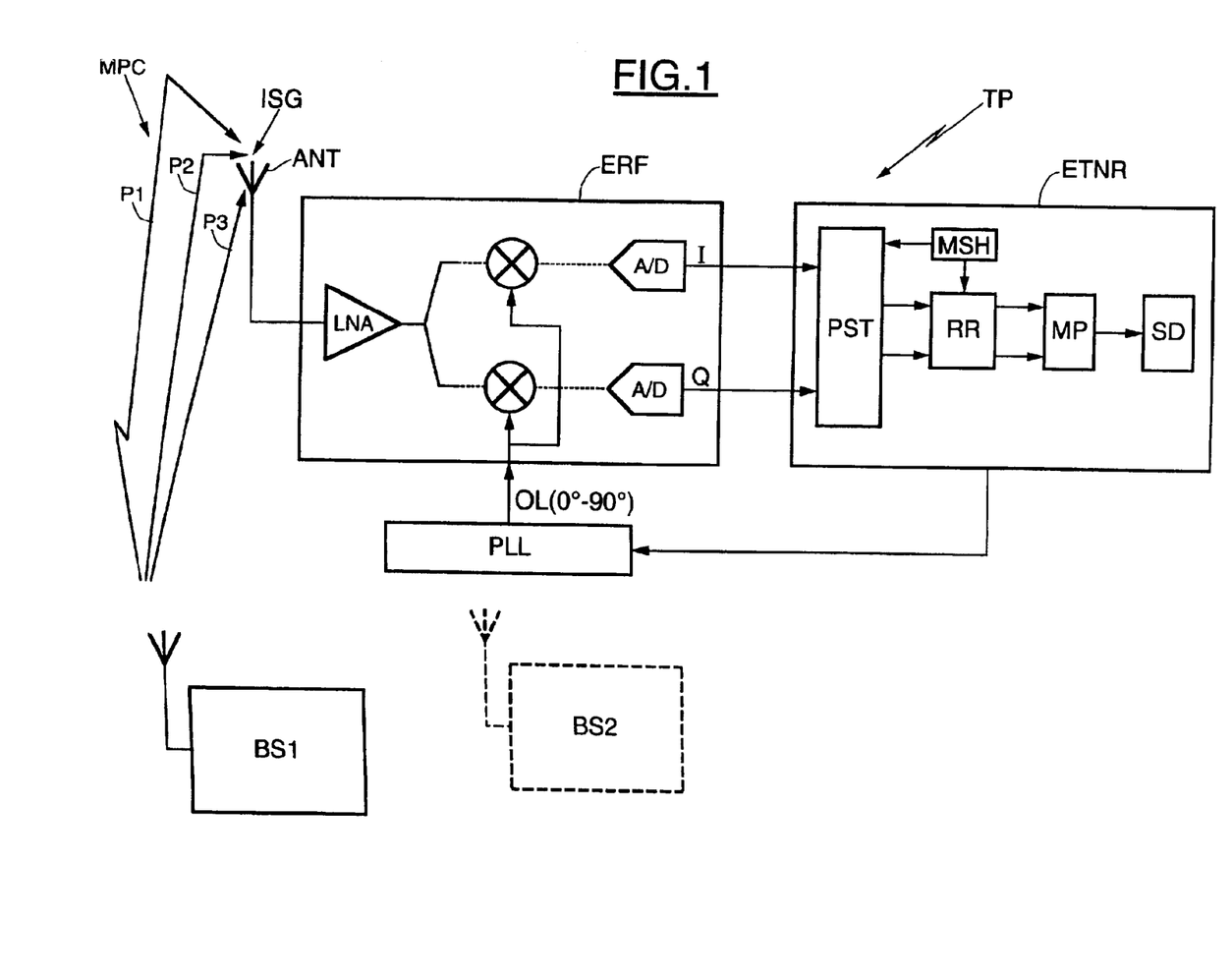
FIG. 1 schematically illustrates an architecture of a cellular mobile telephone incorporating a device for determining fading coefficients according to the present invention.

In FIG. 1, the reference TP designates a remote terminal, such as a cellular mobile telephone, which is in communication with a base station BS1 according to a CDMA-FDD type communication scheme, for example. The cellular mobile telephone conventionally comprises a radio frequency analog stage ERF connected to an antenna ANT to receive an input signal ISG.

Conventionally, the stage ERF comprises a low noise amplifier LNA and two processing channels comprising mixers, filters and conventional amplifiers. The two mixers respectively receive from a phase-locked loop PLL two signals mutually having a phase difference of 90°. After a frequency translation in the mixers, both processing channels respectively define two streams I (in-phase stream) and Q (quadrature phase stream). These designations are well known to those skilled in the art. After digital conversion in the analog-to-digital converters, the two streams I and Q are delivered to a receive processing stage ETNR.

Due to possible reflections of the signal initially transmitted, from obstacles located between the base station and the mobile telephone, the transmission medium is in fact a multi-path transmission medium MPC. That is, it comprises several different transmission routes. Three transmission routes P1, P2 and P3 are depicted in FIG. 1. Consequently, the signal ISG received by the mobile telephone includes various temporally delayed versions of the initially transmitted signal. These versions are the result of the multi-path transmission characteristics of the transmission medium. In addition, each path introduces a different delay.

The processing stage ETNR comprises a device PST for determining the fading coefficients of the paths of the multi-path transmission channel. The various time delays $\tau$ of the different paths of the multi-path channel are estimated by a search unit MSH and can be continually tracked, for example, by a digital phase-locked loop.

The structure of a search unit and a tracking unit are well known to those skilled in the art. Briefly, the multi-paths which arrive at the search unit lead to obtaining correlation peaks occurring at different instants. The amplitude of a peak is proportional to the path's signal envelope, and the instant of each peak, relative to the first arrival, provides a measure of the delay of the corresponding path. The information on these delays, which also gives the number of fingers of the Rake receiver, is delivered by the unit MSH to the Rake receiver RR, as well as to the estimation device PST according to the invention.

The Rake receiver RR, which is in a cellular mobile telephone operating in a CDMA communication system, is used to carry out time alignment, descrambling, and despreading for combining the delayed versions of the initially transmitted signal, in such a manner as to deliver the information streams contained in the initial signal. Of course, the received signal ISG could also result from the transmission of initial signals respectively transmitted by different base stations BS1 and BS2.

The Rake receiver RR is followed by conventional means MP of demodulation which demodulates the signals delivered by the Rake receiver RR. The processing stage ETNR also conventionally comprises a source decoder SD which performs a source decoding that is well known to those skilled in the art. Also well known to those skilled in the art, the phase-locked loop PLL is controlled by an automatic frequency control algorithm incorporated in a processor in the stage ETNR.

Before transmission via the antenna from the base station BS1, the initial signal containing the information (symbols) is scrambled and spread by processing means of the base station, using the scrambling code of the base station and the orthogonal code (OVSF code) of the telephone TP. Consequently, the symbols are converted to chips having a predetermined length (for example, equal to 260 ns), and corresponding to a predetermined chip rate equal, for example, to 3.84 Mcps. Thus, the chip rate is greater than the symbol rate. A symbol can thus be transformed into a number of chips that can be from 4 to 256.

Figure 4:
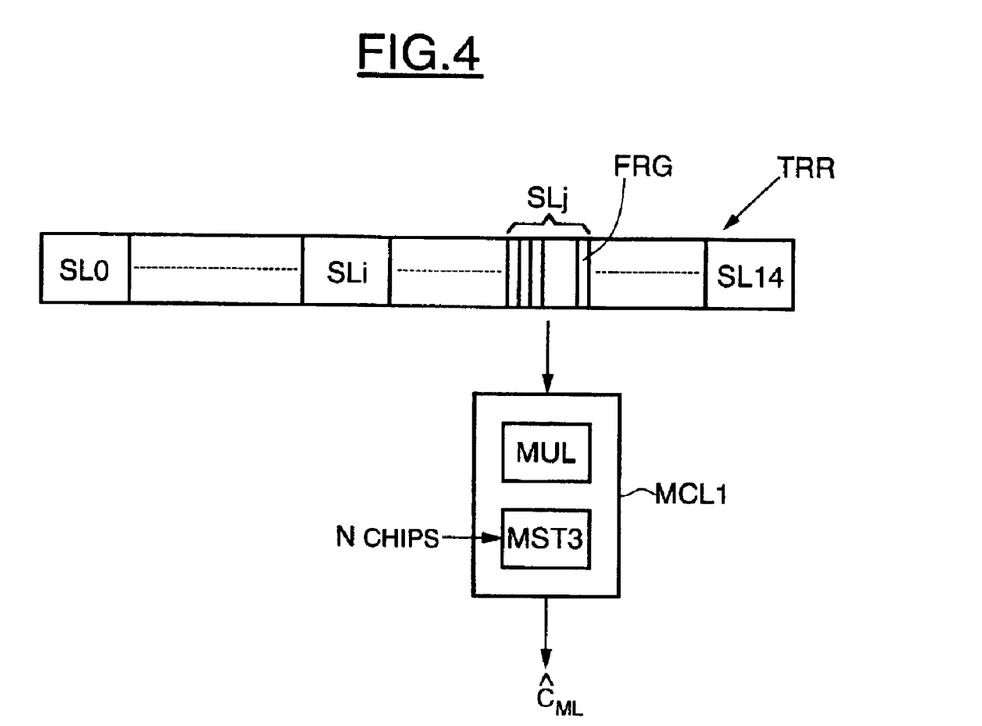
FIG. 4 schematically illustrates another embodiment and implementation of a device according to the present invention, enabling more particularly a first estimation of the fading coefficients in the sense of maximum likelihood.

As illustrated in FIG. 4, the information transmitted by the base station is made up of chips and is conveyed within successive frames TRR each subdivided into a predetermined number of slots SLi. As a guide, each frame TRR having a length of 10 ms is subdivided into 15 slots SL0–SL14, with each slot having a length equal to 2560 chips.

The information received by the telephone and originating from the base station comprises data conveyed over a DPDCH data channel, and control information conveyed over a DPCCH control channel. In the downlink direction, each time slot SLi of the frame TRR contains in an interleaved manner data and control information. This is very well known to those skilled in the art.

In the downlink direction, a common pilot channel (CPICH) is also provided which uses a spreading factor of 256, and continually transmits pilot symbols. In the uplink direction, the pilot symbols are uniquely contained only in the DPCCH control channel. In the CDMA-FDD system, the CPICH channel is a downlink channel having a fixed bit rate and conveying predefined sequences of known symbols. Moreover, this channel is unmodulated.

Figure 2:
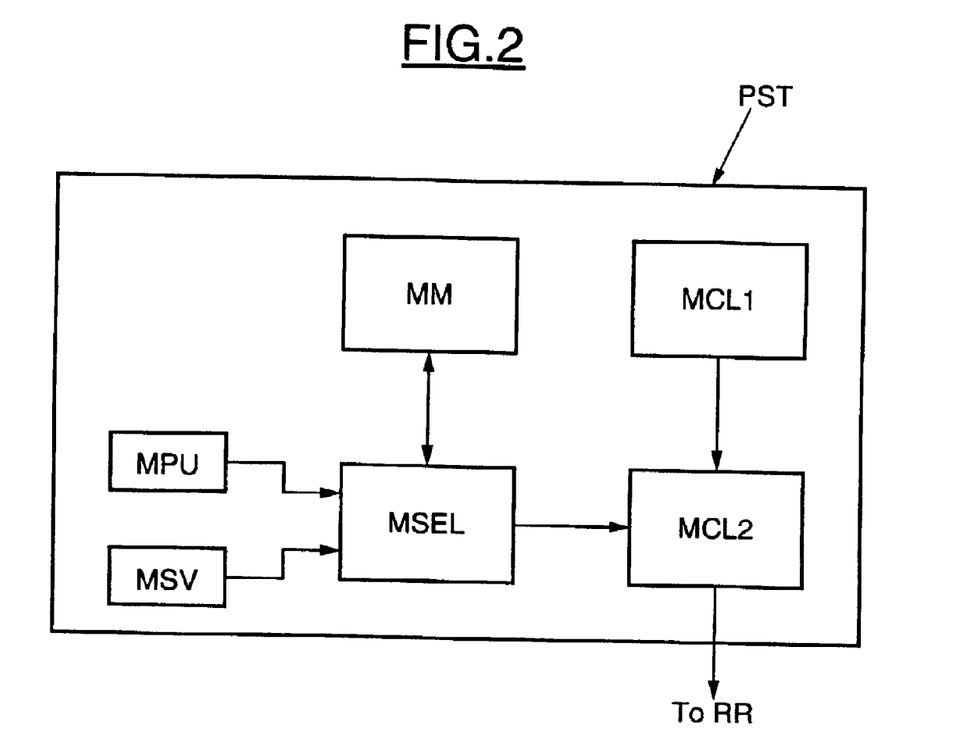
FIG. 2 illustrates in more detail but still schematically an internal architecture of a device for determining fading coefficients according to the present invention.

The determination device PST according to the invention will determine the fading coefficients associated with the different paths, that is, it will perform a channel estimation. These fading coefficients will then be communicated to the Rake receiver RR.

In a CDMA transmission system, considered here by way of a non-limiting example, the user data $a_k$ is oversampled by a spreading factor Nc and then multiplied by a user spreading factor d which is a vector of Nc components $d_v$. The received signal can be written according to formula (1):

$$r(t) = \sum_{l=0}^{N_p-1} c_l(t) \sum_n a_n \sum_{v=0}^{N_c-1} d_v g_T(t - nT - vT_c - \tau_l) + m(t) \quad (1)$$

where:
$g_T(t)$: impulse response of the transmission filter;
$N_p$: number of paths;
$\tau_l$: delay associated with the lth path;
m(t): noise (assumed to be appreciably white);
$c_l(t)$: fading coefficient of the lth path;
T: duration of a symbol; and
$T_c$: duration of a chip.

From this formula, the signal received in the lth finger after filtering by the filter adapted for reception, interpolation and decimation at the frequency of the chips is written according to formula (2) below:

$$z_{l;k} = a_n \sum_{v=0}^{N_c-1} c_{l;k} d_v g(t - nT - vT_c - \tau_l) + m_{l;k} \quad (2)$$

After filtering in an impulse type filter and after despreading, the result thereof is defined by formula (3) below:

$$y_{l;n} = \sum_{k=nNc}^{(n+1)Nc-1} d_{k \bmod Nc} z_{l;k} + m_{l;k} \quad (3)$$

$$= a_n c_{l;n} + m_{l;n}$$

where $c_{l;n}$ is the fading coefficient at the instant n associated with finger 1.

It is then known to the person skilled in the art that the optimal determination $\hat{c}$ of the fading coefficients is obtained by filtering estimations $\hat{c}_{ML}$ obtained in the sense of maximum likelihood, by a Wiener filter W according to formula (4) below:

$$\hat{c} = W^{H*} \hat{c}_{ML} \quad (4)$$

Formula (4) is translated in a matrix and in a vectorial manner by formula (5) below:

$$\hat{c}_n = c_D^H \cdot (C_D + N0 \cdot I)^{-1} \cdot \begin{pmatrix} \hat{c}_{ML,n-N_w+P} \\ \vdots \\ \hat{c}_{ML,n-1+P} \end{pmatrix} \quad (5)$$

where $C_D$ designates the matrix of autocorrelation of coefficients of the channel, and $c_D$ designates the vector of autocorrelation samples of coefficients of the channel. $C_D$ and $c_D$ are defined by formulas (6) and (7) below:

$$C_D = \rho \cdot \begin{pmatrix} \alpha(0) & \cdots & \alpha(N_w-1) \\ \vdots & \ddots & \vdots \\ \alpha(N_w-1) & \cdots & \alpha(0) \end{pmatrix} \quad (6)$$

$$c_d = \rho \cdot (\alpha(N_w-1-P) \ldots \alpha(1-P))^T \quad (7)$$

In these formulas, $N_w$ designates the number of coefficients of the Wiener filter, $\rho$ designates the power of the signal and P is a coefficient which, if it is positive, represents a smoother filter, and if it is negative, represents a predictor filter.

The determination of the fading coefficients $\hat{c}_n$ according to formulas (5), (6) and (7) requires determining the autocorrelation samples of the coefficients of the channel, calculating the autocorrelation function and carrying out a matrix inversion. However, this is too complex to implement. Moreover, in terms of stability, the calculation of the autocorrelation function can, due to the signal/noise ratio, give rise to instabilities in the matrix inversion.

This is why the invention proposes to use an autocorrelation function that is assumed to be known for the fading coefficients. To this end, the Jake model, well known to the person skilled in the art, can be used. The Jake model is an autocorrelation model generally adopted in the built-up environment. More specifically, in this case the autocorrelation $R_c$ of the fading coefficients $c_1$ associated with the lst path is defined by formula (7'):

$$R_c(r) = \rho_1 J_o(2\pi f_d \cdot n) = \rho_1 \cdot \alpha(n) \quad (7')$$

where:

$\rho_1$ designates the power of the signal from the lth path associated with this lth coefficient;

$J_o$ designates the Bessel function of the first kind of order zero; and $f_d$ designates the normalized Doppler frequency which is equal to the product of the carrier frequency (for example, 2 GHz), and the ratio between the speed of movement of the telephone and the speed of light.

Then, in formulas (6) and (7) the autocorrelation defined by formula (7') is replaced, and for each fading coefficient, formulas (8) and (9) are obtained in which K is equal to $2\pi f_d$.

$$C_D = \rho \cdot \begin{pmatrix} J_0(0) & \cdots & J_0(K \cdot (N_w-1)) \\ \vdots & \ddots & \vdots \\ J_0(K \cdot (N_w-1)) & \cdots & J_0(0) \end{pmatrix} \quad (8)$$

$$c_D = \rho \cdot (J_0(K \cdot (N_w-1-P)) \ldots J_0(K \cdot (N_w-1-P)))^T \quad (9)$$

The Wiener filter W is then calculated by formula (10):

$$w^H = c_D{}^H (C_D + N0 I)^{-1} \quad (10)$$

where N0 represents white noise.

As a consequence that for each fading coefficient, the Wiener filter depends only on the power $\rho_1$ of the signal from the path associated with the fading coefficient, and on the speed of movement of the mobile terminal. It is therefore possible to precalculate these filters and tabulate them according to these two parameters, i.e., power and speed.

This is carried out in step 31 (FIG. 3), and the various sets of coefficients $N_w$ of the filters are stored in a memory MM of the estimation device PST (FIG. 2). As a guide, in the memory MM, 40 different Wiener filters with eight coefficients are stored. That is, 40 different sets of eight coefficients are stored. These sets are respectively precalculated for eight speeds, for example, 3, 30, 50, 80, 120, 200, 300 and 500 km/hr and for five signal power values, for example, 5, 10, 15, 20 and 25 dB.

To determine in real time the fading coefficients of the various paths of the channel, the speed of movement of the mobile terminal and the power of the signal from each path will therefore need to be estimated. The power is determined by means MPU which are conventional and of known structure. Such a parameter is conventionally and usually determined for other reasons in a wireless communication system.

Regarding estimation of the speed of movement, this is carried out by estimation means MSV, implementing any known speed estimation method. Estimation means include, for example, that described in the French Patent No. 2,782, 227, or in the article by Chengshan Xiao et al. entitled "Mobile Speed Estimation for TDMA-Based Hierarchical Cellular Systems", 1999, IEEE, pages 2456–2460.

From this point, selection means MSEL will determine for each fading coefficient, that is, for each path among the eight reference speeds and the five signal power values, those which are the nearest, for example, in terms of a Euclidean distance, to the estimated value of the speed of movement of the mobile terminal and the calculated value of the power of the signal. The selection means MSEL then extract from the memory MM, for each path, the corresponding set of Wiener coefficients (step 34, FIG. 3).

Figure 3:
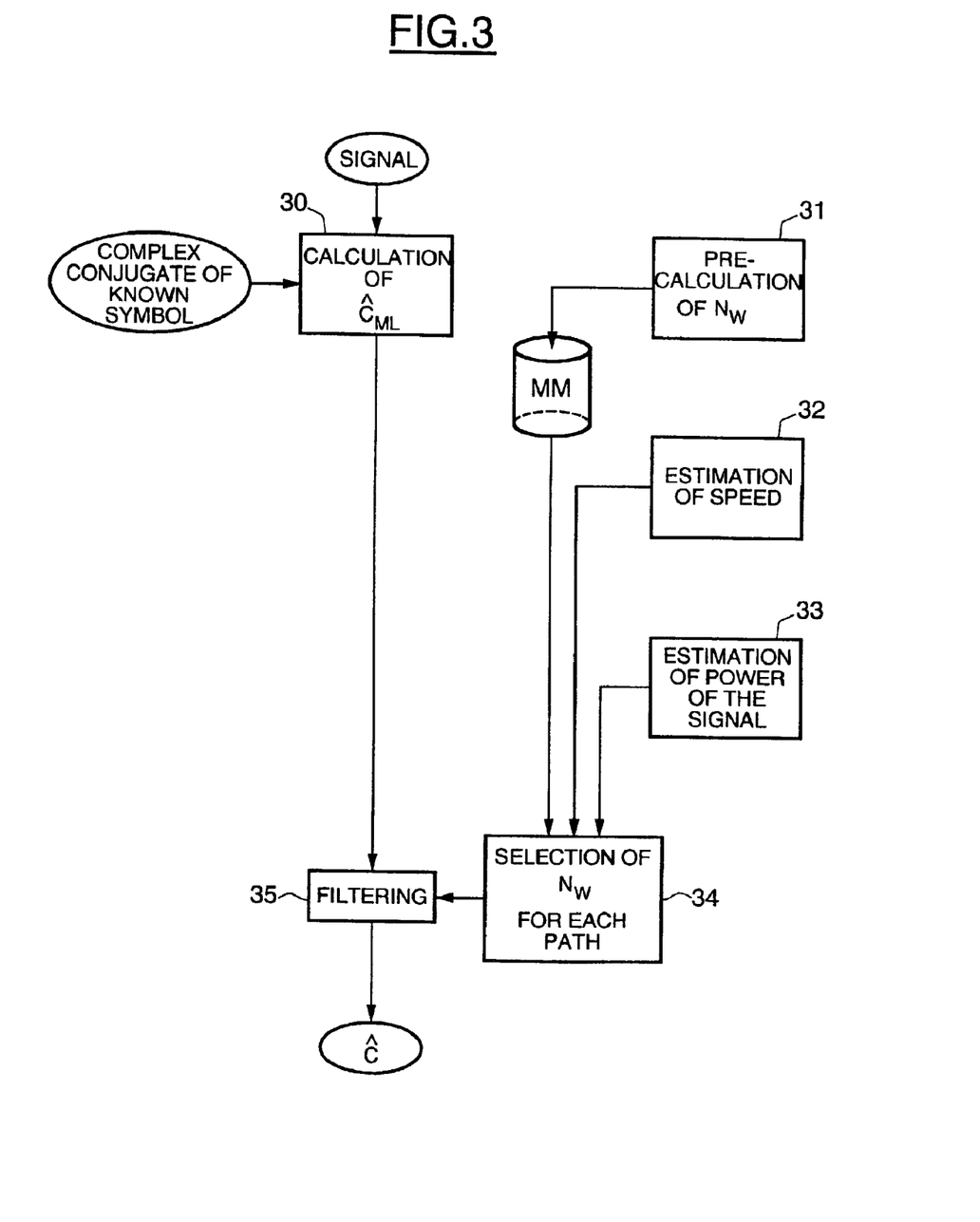
FIG. 3 schematically shows a flow diagram of a mode of implementation of a method according to the present invention.

Moreover, first means of calculation MCL1 will determine (step 30) the first estimation values $\hat{c}_{ML}$ of the fading coefficients in the sense of maximum likelihood. To this end, these first estimation values are obtained by multiplying the signals $y_{l;n}$ by the complex conjugate of a known symbol. In the example described herein, the known symbols used are those conveyed by the CPICH channel.

Moreover, it is not necessary to calculate these first estimation values for each chip FRG (FIG. 4) because on a chip the fading does not change much. Also, it is preferable to determine these first estimation values $\hat{c}_{ML}$ on a certain number of chips of each slot SLj. In other words, estimation means MST3 will perform this estimation on N chips, for example, by calculating a mean value. N can, for example, be taken to be equal to 256 or 512. As a preference, the value 512 will be used which leads to obtaining five estimation values for each chip.

Once these first estimation values have been determined, the second calculation means MCL2 will perform, for each path, the filtering of the first estimation values by the preselected set of coefficients (step 35). This calculation is performed according to formula (4) and enables the fading coefficients ĉ to be obtained. From a hardware perspective, means MCL1, MCL2, MST1, MSEL and MSU can, for example, be developed in software through a processor or even designed directly within an application specific integrated circuit (ASIC).

That which is claimed is:

1. A method for determining fading coefficients of paths of a multi-path transmission channel linking a base station and a mobile terminal, the method comprising:
   determining first estimation values of the fading coefficients in a sense of maximum likelihood;
   storing sets of coefficients of a Wiener filter respectively precalculated for sets of different predetermined values of speed of movement of the mobile terminal and of power of a signal, using an autocorrelation function that is assumed to be known for the fading coefficients;
   estimating the speed of movement of the mobile terminal and of the power of the signal of each path;
   selecting for each path a set of precalculated Wiener filter coefficients based upon a comparison between the estimated speed of movement and the power of the signal, and the sets of predetermined values of the speed of movement and of the power of the signal; and
   determining the fading coefficients obtained by filtering the first corresponding estimation values using the selected sets of precalculated Wiener coefficients.

2. A method according to claim 1, wherein the autocorrelation function comprises a Bessel function of a first kind of order zero.

3. A method according to claim 1, wherein determining the first estimation values comprises multiplying the signals from the various paths by a complex conjugate of a known symbol.

4. A method according to claim 1, wherein information conveyed on the transmission channel between the base station and the mobile terminal comprises chips conveyed within successive frames, with each frame being subdivided into a predetermined number of slots; and wherein determining the first estimation values comprises estimating the first values on a predetermined number of chips of each slot.

5. An estimation device for estimating fading coefficients of paths of a multi-path transmission channel linking a base station and a mobile terminal, the estimation device comprising:
   first calculation means for determining first estimation values of the fading coefficients in a sense of maximum likelihood;
   a memory for storing sets of coefficients of a Wiener filter respectively precalculated for several sets of different predetermined values of speed of movement of the mobile terminal and of signal power, using an autocorrelation function that is assumed to be known for the fading coefficients;
   first estimation means for estimating the speed of movement of the mobile terminal;
   second estimation means for estimating the signal power of each path;
   selection means connected to said first and second estimation means for selecting for each path a set of precalculated Wiener filter coefficients based upon a comparison between the estimated speed of movement and the signal power and the sets of predetermined values of speed of movement and of the signal power; and
   second calculation means connected to said selection means and to said first calculation means for determining the fading coefficients by filtering the first corresponding estimation values using the selected sets of precalculated Wiener coefficients.

6. An estimation device according to claim 5, wherein the autocorrelation function comprises a Bessel function of the first kind of order zero.

7. An estimation device according to claim 5, wherein said first calculation means multiplies the signals from the various paths by a complex conjugate of a known symbol.

8. An estimation device according to claim 5, wherein information conveyed on the transmission channel between the base station and the mobile terminal comprises chips conveyed within successive frames, with each frame being subdivided into a predetermined number of slots; and wherein said first calculation means comprise third estimation means for estimating the first values on a predetermined number of chips of each slot.

9. An estimation device for estimating fading coefficients of paths of a multi-path transmission channel received by a mobile terminal, the estimation device comprising:
   a first calculation circuit for determining first estimation values of the fading coefficients in a sense of maximum likelihood;
   a memory for storing sets of coefficients of a Wiener filter respectively precalculated for several sets of different predetermined values of speed of movement of the mobile terminal and of signal power, using an autocorrelation function;
   a first estimation circuit for estimating the speed of movement of the mobile terminal;
   a second estimation circuit for estimating the signal power of each path;
   a selection circuit connected to said first and second estimation circuits for selecting for each path a set of precalculated Wiener filter coefficients based upon a comparison between the estimated speed of movement and the signal power and the sets of predetermined values of speed of movement and of the signal power; and
   a second calculation circuit connected to said selection circuit and to said first calculation circuit for determining the fading coefficients by filtering the first corresponding estimation values using the selected sets of precalculated Wiener coefficients.

10. An estimation device according to claim 9, wherein the autocorrelation function is assumed to be known for the fading coefficients.

11. An estimation device according to claim 9, wherein the autocorrelation function comprises a Bessel function of the first kind of order zero.

12. An estimation device according to claim 9, wherein said first calculation circuit multiplies the signals from the various paths by a complex conjugate of a known symbol.

13. An estimation device according to claim 9, wherein information conveyed on the transmission channel comprises chips conveyed within successive frames, with each frame being subdivided into a predetermined number of slots; and wherein said first calculation circuit comprises a third estimation circuit for estimating the first values on a predetermined number of chips of each slot.

14. A mobile terminal comprising:
   an antenna for receiving signals over a multi-path transmission channel;
   an RF analog stage connected to said antenna; and
   a receiver processing stage connected to said RF analog stage for processing the received signals, and comprising an estimation device for estimating fading coefficients of paths of the multi-path transmission channel, the estimation device comprising
   a first calculation circuit for determining first estimation values of the fading coefficients in a sense of maximum likelihood;

a memory for storing sets of coefficients of a Wiener filter respectively precalculated for several sets of different predetermined values of speed of movement of the mobile terminal and of signal power, using an autocorrelation function;

a first estimation circuit for estimating the speed of movement of the mobile terminal;

a second estimation circuit for estimating the signal power of each path;

a selection circuit connected to said first and second estimation circuits for selecting for each path a set of precalculated Wiener filter coefficients based upon a comparison between the estimated speed of movement and the signal power and the sets of predetermined values of speed of movement and of the signal power; and a second calculation circuit connected to said selection circuit and to said first calculation circuit for determining the fading coefficients by filtering the first corresponding estimation values using the selected sets of precalculated Wiener coefficients.

15. A mobile terminal according to claim 14, wherein the autocorrelation function comprises a Bessel function of the first kind of order zero.

16. A mobile terminal according to claim 14, wherein autocorrelation function is assumed to be known for the fading coefficients.

17. A mobile terminal according to claim 14, wherein said first calculation circuit multiplies the signals from the various paths by a complex conjugate of a known symbol.

18. A mobile terminal according to claim 14, wherein information conveyed on the transmission channel comprises chips conveyed within successive frames, with each frame being subdivided into a predetermined number of slots; and wherein said first calculation circuit comprises a third estimation circuit for estimating the first values on a predetermined number of chips of each slot.

19. A mobile terminal according to claim 14, wherein the mobile terminal is configured as a cellular mobile telephone.

20. A mobile terminal according to claim 14, wherein the mobile terminal operates according to a UMTS standard.

21. A mobile terminal according to claim 14, wherein the signals received over the multi-path transmission channel are transmitted by a base station.

* * * * *